United States Patent
Kani et al.

(10) Patent No.: US 9,682,360 B2
(45) Date of Patent: Jun. 20, 2017

(54) RADIONUCLIDE ADSORBENT, METHOD OF PRODUCING RADIONUCLIDE ADSORBENT AND PRODUCTION APPARATUS THEREOF

(71) Applicant: Hitachi-GE Nuclear Energy, Ltd., Hitachi-shi, Ibaraki (JP)

(72) Inventors: Yuko Kani, Tokyo (JP); Takashi Asano, Hitachi (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 488 days.

(21) Appl. No.: 14/135,304

(22) Filed: Dec. 19, 2013

(65) Prior Publication Data

US 2014/0178282 A1    Jun. 26, 2014

(30) Foreign Application Priority Data

Dec. 20, 2012 (JP) ................................. 2012-278102

(51) Int. Cl.
*B01J 20/10* (2006.01)
*B01J 20/30* (2006.01)
(Continued)

(52) U.S. Cl.
CPC .......... *B01J 20/10* (2013.01); *B01J 20/0211* (2013.01); *B01J 20/3071* (2013.01); *B01J 20/3085* (2013.01); *G21F 9/12* (2013.01)

(58) Field of Classification Search
None
See application file for complete search history.

(56) References Cited

U.S. PATENT DOCUMENTS

| 5,989,434 A | 11/1999 | Lundquist et al. |
| 7,332,089 B2 | 2/2008 | Harjula et al. |
| 2004/0065620 A1 | 4/2004 | Harjula et al. |

FOREIGN PATENT DOCUMENTS

| JP | 4-86599 A | 3/1992 |
| JP | 09021066 A * | 1/1997 |

(Continued)

OTHER PUBLICATIONS

Wilmarth et al, Effect of Sodium Hydroxide Pretreatment of UOP IONSIV IE-911 Crystalline Silicotitanate Sorbent, Aug. 2000, 10 pages.*

(Continued)

*Primary Examiner* — Colin W Slifka
(74) *Attorney, Agent, or Firm* — Crowell & Moring LLP

(57) ABSTRACT

Granular crystalline silicotitanate (CST) is supplied from an adsorbent raw material supply apparatus into a caustic treatment apparatus. A sodium hydroxide solution of 1 Mol/L in a caustic agent supply apparatus is supplied into the caustic treatment apparatus with the granular CST supplied. After a predetermined quantity of the sodium hydroxide solution is supplied to the caustic treatment apparatus, the supply of the sodium hydroxide solution to the caustic treatment apparatus is stopped. The granular CST is left to stand for 0.5 hour in the state that it is immersed in the sodium hydroxide solution in the caustic treatment apparatus and is subjected to the caustic treatment. After that, the granular CST subjected to the caustic treatment is cleaned by cleaning water in a cleaning water supply apparatus. The respective adsorptive performances of cesium and strontium of the granular CST subjected to the caustic treatment are improved more.

6 Claims, 3 Drawing Sheets

(51) Int. Cl.
*G21F 9/12* (2006.01)
*B01J 20/02* (2006.01)

(56) References Cited

FOREIGN PATENT DOCUMENTS

| JP | 2001-133594 A | 5/2001 |
|---|---|---|
| JP | 2001-522032 A | 11/2001 |
| JP | 2002-515587 A | 5/2002 |
| JP | 2007-271306 A | 10/2007 |
| JP | 4879869 | 6/2009 |
| JP | 2011-200856 A | 10/2011 |

OTHER PUBLICATIONS

Screen Shot showing the date of publication of the Wilmarth reference.*
"UOP IONSIV(TM) Ion Exchangers" product description from UOP website (http://www.uop.com/?document=uop-ionsiv-ion-exchangers&download=1), accessed Jul. 5, 2016.*
JP 09021066 A, Yamada et al, Jan. 1997, English Abstract from PAJ.*
MayNyman, etal.,"Characterization of UOP INOSIV IE-911",Sandia Report,SAND2001-0999,Printed Jun. 2001, Sandia National Laboratories.
Ojietal.,Selective Removal of Strontium and Cesium from Simulated Waste Solution with Titanate Ion-exchangers in a Filter Cartridge Configurations.-12092, WM2012 Conference, Feb. 26-Mar. 1, 2012,Phoenix,Arizona, USA,12092 (2012).

* cited by examiner

RADIONUCLIDE ADSORBENT, METHOD OF PRODUCING RADIONUCLIDE ADSORBENT AND PRODUCTION APPARATUS THEREOF

CLAIM OF PRIORITY

The present application claims priority from Japanese Patent application serial no. 2012-278102, filed on Dec. 20, 2012, the content of which is hereby incorporated by reference into this application.

BACKGROUND OF THE INVENTION

Technical Field

The present invention relates to a radionuclide adsorbent, a method of producing a radionuclide adsorbent and a production apparatus thereof, and more particularly to a radionuclide adsorbent suitable for adsorption of radioactive cesium and radioactive strontium, a method of producing radionuclide adsorbent and a production apparatus thereof.

Background Art

As one of treatment methods of a radioactive waste liquid including radionuclides generated in nuclear power facilities, there is a treatment method of adsorbing and removing radionuclides by an inorganic adsorbent and an ion exchange resin.

The radioactive cesium and radioactive strontium among the radionuclides included in the radioactive waste liquid become a heat source and a radiation source, so that it is preferable to separate them from the radioactive waste liquid.

Since the radioactive cesium and radioactive strontium included in the radioactive waste liquid are different from each other in the chemical property, there is a method of separating the radioactive cesium and radioactive strontium using different adsorbents, as described in Japanese Patent Laid-open No. 2007-271306. Further, as an adsorbent of separating the radioactive cesium included in the radioactive waste liquid by adsorption, for example, a Prussian blue metallic complex described in Japanese Patent Laid-open No. 2011-200856 and calix described in Japanese Patent 4879869 are used. Further, as an adsorbent of adsorbing the radioactive strontium, for example, there is manganese dioxide described in Japanese Patent Laid-Open No. 4(1992)-86599. Furthermore, the adsorbent proposed in Oji et al., WM2012 Conference, Feb. 26-Mar. 1, 2012, Phoenix, Ariz., USA, 12092 (2012) is granular crystalline silicotitanate (CST) and the CST can adsorb both of cesium and strontium. If this adsorbent is used, both of radioactive cesium and radioactive strontium can be separated and removed from the radioactive waste liquid.

May Nyman, et al., "Characterization of UOP INOSIV IE-911", SANDIA REPORT, SAND2001-0999, Printed June 2001, Sandia National Laboratories describes that when a radioactive waste liquid including Cs is supplied to a column with CST filled, the column is clogged with Zr, Nb and a treatment efficiency of the radioactive waste liquid including Cs is reduced, and in order to prevent a reduction in the treatment efficiency, the CST is treated with a sodium hydroxide solution beforehand to remove soluble Zr, Nb, and Si.

CITATION LIST

Patent Literature

[Patent Literature 1] Japanese Patent Laid-open No. 2007-271306,

[Patent Literature 2] Japanese Patent Laid-open No. 2011-200856

[Patent Literature 3] U.S. Pat. No. 4,879,869

[Patent Literature 4] Japanese Patent Laid-Open No. 4(1992)-86599

Non Patent Literature

[Non Patent Literature 1] Oji et al., WM2012 Conference, Feb. 26-Mar. 1, 2012, Phoenix, Ariz., USA, 12092 (2012)

[Non Patent Literature 2] May Nyman, et al., "Characterization of UOP INOSIV IE-911", SANDIA REPORT, SAND2001-0999, Printed June 2001, Sandia National Laboratories

SUMMARY OF THE INVENTION

Technical Problem

The CST, as mentioned above, is an adsorbent capable of adsorbing both of cesium and strontium. When treating a radioactive waste liquid including cesium and strontium using the CST, it is desired to more improve the respective adsorptive performances of cesium and strontium by the CST.

An object of the present invention is to provide a radionuclide adsorbent capable of more improving respective adsorptive performances of cesium and strontium, a method of producing a radionuclide adsorbent capable of obtaining the radionuclide adsorbent capable of more improving the adsorptive performances and a production apparatus thereof.

Solution to Problem

A feature of the present invention for attaining the above object is that a silicotitanate compound is put in a caustic treatment apparatus, and the silicotitanate compound is brought into contact with a sodium hydroxide solution having a sodium hydroxide concentration within a range of 0.5 Mol/L or more but less than 2.0 Mol/L in the caustic treatment apparatus.

The silicotitanate compound is brought into contact with the sodium hydroxide solution having a sodium hydroxide concentration within the range of 0.5 Mol/L or more but less than 2.0 Mol/L, so that a radionuclide adsorbent with respective adsorptive performances of radioactive cesium and radioactive strontium improved can be obtained.

Advantageous Effect of the Invention

According to the present invention, a radionuclide adsorbent that the respective adsorptive performances of radioactive cesium and radioactive strontium are improved can be obtained.

DETAILED DESCRIPTION OF THE PREFERRED EMBODIMENTS

The inventors carried out various examinations in order to more improve adsorptive performance of radioactive cesium and radioactive strontium in a silicotitanate compound. As a result of those examinations, the inventors newly found that the adsorptive performance of radioactive cesium and radioactive strontium can be improved more by performing caustic treatment for the silicotitanate compound. The examination result will be explained below.

As a silicotitanate compound, there exists crystalline silicotitanate (hereinafter referred to as CST), which is sold in a granular state (for example, IE-910 manufactured by UOP LLC. Co., Ltd.) and a formed state (for example, IE-911 manufactured by UOP LLC. Co., Ltd.).

The inventors used IE-911 as a CST which is a silicotitanate compound and performed the caustic treatment for the IE-911. Namely, 10 g of the IE-911 is immersed in 50 mL of a 1M sodium hydroxide solution and is left to stand for 30 minutes at room temperature. Thereafter, the sodium hydroxide solution is removed and the IE-911 immersed in the sodium hydroxide solution is cleaned with a small quantity of water. Thereafter, the cleaned IE-911 is dried.

The inventors thus prepared two types of IE-911, that is, IE-911 made to undergo such a series of processes of the immersion of IE-911 in the sodium hydroxide solution, the cleaning of IE-911, and the drying of IE-911 once (one time of Na treatment); and IE-911 made to undergo that particular series of processes four times (four times of Na treatment). Then, using IE-911 with no caustic treatment performed, the prepared IE-911 (one time of Na treatment), and the prepared IE-911 (four times of Na treatment), the respective adsorptive performances of radioactive cesium and radioactive strontium were examined.

Cs-137 as radioactive cesium and Sr-85 as radioactive strontium were added at a concentration of approximately 100 Bq/mL into neutral man-made seawater (obtained by dissolving Marine Art SF-1 produced by Tomita Pharmaceutical Co., Ltd. in ion exchange water). The IE-911 and man-made seawater were mixed at a volume ratio of 1:100. IE-911 and the man-made seawater were left to stand for about one week in the mixed state, and then a part of the man-made seawater was sampled, and the respective concentrations of Cs-137 and Sr-85 in the sampled man-made seawater were measured. The respective concentrations of Cs-137 and Sr-85 in the man-made seawater before the IE-911 was added and the respective concentrations of Cs-137 and Sr-85 in the man-made seawater at the point of time when one week elapsed after addition of the IE-911 were substituted in the following formula, and the respective distribution coefficients of Cs-137 and Sr-85 were obtained.

Distribution coefficient (mL/g)=[((radionuclide concentration before CST addition)−(radionuclide concentration after CST addition))/(radionuclide concentration after CST addition)]×volume of man-made seawater (mL)/CST weight (g)

Figure 3:
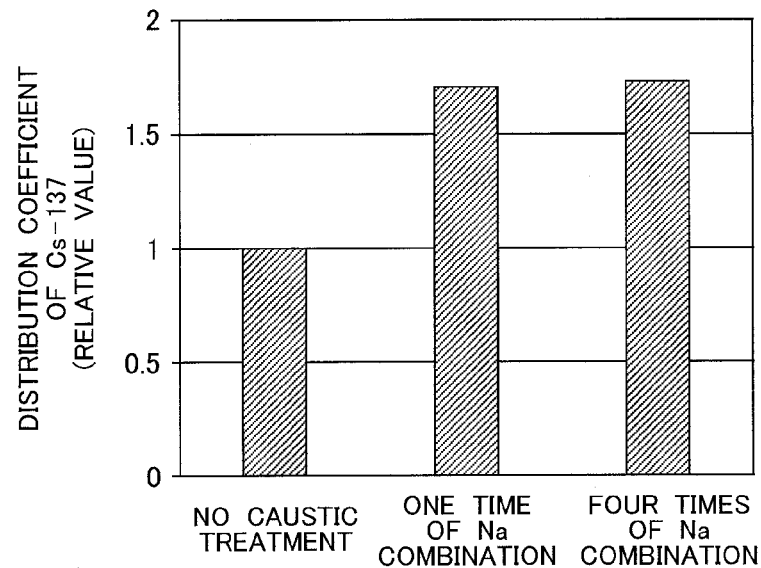
FIG. 3 is an explanatory drawing showing adsorptive performance of radioactive cesium of a radionuclide adsorbent produced in embodiment 1.
Figure 4:
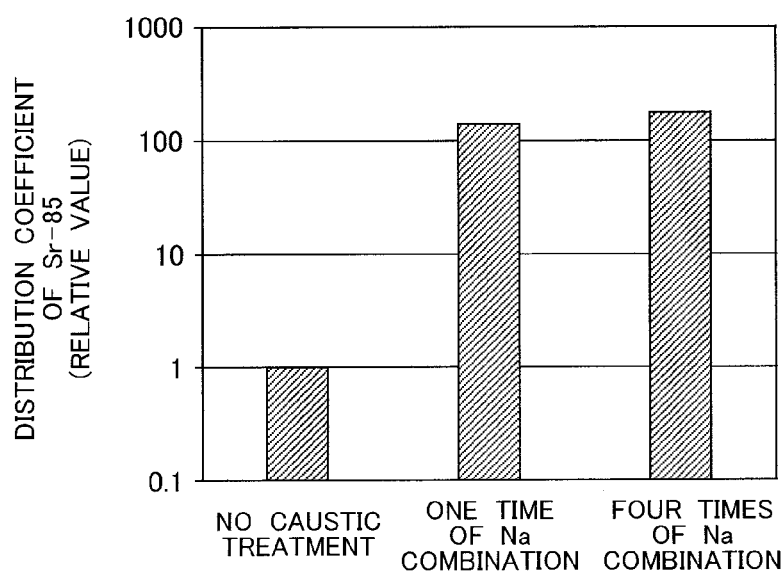
FIG. 4 is an explanatory drawing showing adsorptive performance of radioactive strontium of a radionuclide adsorbent produced in embodiment 1.

FIG. 3 shows a distribution coefficient of Cs-137 and FIG. 4 shows a distribution coefficient of Sr-85. The respective distribution coefficients shown in FIGS. 3 and 4 are relative values assuming a distribution coefficient of IE-911 with no caustic treatment performed (no caustic treatment) as 1. As shown in FIG. 3, the distribution coefficients of the respective Cs-137 of IE-911 (one time of Na treatment) and IE-911 (four times of Na treatment) with the caustic treatment performed are approximately 1.7 times the distribution coefficient of Cs-137 of IE-911 with no caustic treatment performed. The respective distribution coefficients of IE-911 (one time of Na treatment) and IE-911 (four times of Na treatment) are the same and the distribution coefficient of Cs-137 does not change by the number of times of the caustic treatments.

As shown in FIG. 4, the distribution coefficients of the Sr-85 of IE-911 (one time of Na treatment) and IE-911 (four times of Na treatment) with the caustic treatment performed are increased to more than 100 times the distribution coefficient of Sr-85 of IE-911 with no caustic treatment performed. Even in Sr-85, the respective distribution coefficients of IE-911 (one time of Na treatment) and IE-911 (four times of Na treatment) are the same. The reason that the distribution coefficient of Sr-85, that is, strontium is improved by IE-911 and by subjecting the CST, IE-911 for example, to the caustic treatment, is as follows: When IE-911 is subjected to the caustic treatment, H (hydrogen) included in IE-911 is substituted for Na included in the sodium hydroxide solution and the quantity of Na included in IE-911 is increased. If a radioactive waste liquid including cesium and strontium makes contact with IE-911 with Na increased, Na included in IE-911 is substituted for strontium, so that the quantity of radioactive strontium to be adsorbed to IE-911 with the caustic treatment performed is increased. The increase in the Na quantity of IE-911 by the caustic treatment also increases the quantity of radioactive cesium to be adsorbed to IE-911. IE-911 with the caustic treatment performed improves the adsorptive performances of isotopes of cesium other than Cs-137 or isotopes of strontium other than Sr-90.

By using a radionuclide adsorbent obtained by performing the caustic treatment for a silicotitanate compound (for example, CST), removal efficiency of cesium included in a radioactive waste liquid reached 99% or more and removal efficiency of strontium included in the radioactive waste liquid reached 95% or more.

Since the respective distribution coefficients of Cs-137 and Sr-85 do not change by the number of times of caustic treatments for IE-911, one time is enough for the number of times of caustic treatments for IE-911.

Figure 5:
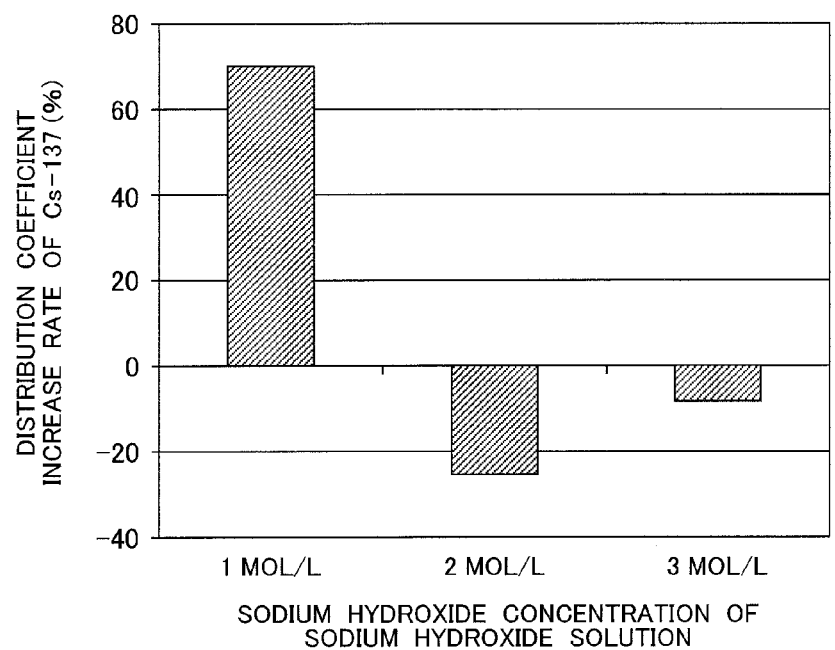
FIG. 5 is an explanatory drawing showing a relation between sodium hydroxide concentration of a sodium hydroxide solution used in a method of producing a radionuclide adsorbent according to embodiment 1 and a distribution coefficient increase rate of radioactive cesium.

The inventors examined the effect of the sodium hydroxide concentration in the sodium hydroxide solution used for the caustic treatment on the distribution coefficient. The test results shown in FIG. 3 were used as a distribution coefficient of Cs-137 in IE-911 immersed in the sodium hydroxide solution at a sodium hydroxide concentration of 1 Mol/L, and the test results compared with the distribution coefficient of Cs-137 of IE-911 not immersed in the sodium hydroxide solution to obtain the increase rate of the distribution coefficient. For the distribution coefficients of Cs-137 in IE-911 immersed in the sodium hydroxide solution at the sodium hydroxide concentration of 2 Mol/L and the sodium hydroxide solution at the sodium hydroxide concentration of 3 Mol/L, the increase rates of the distribution coefficients were obtained by using the distribution coefficients of Cs-137 reported in W. R. Wilmarth, WSRC-TR-2000-00394. The increase rates of the distribution coefficients are shown in FIG. 5. The increase rate of the distribution coefficient of Cs-137 in IE-911 immersed in the sodium hydroxide solution at the sodium hydroxide concentration of 1 Mol/L was approximately 70% at its maximum and the increase rates of the distribution coefficients of Cs-137 in the IE-911 immersed in the sodium hydroxide solutions at the sodium hydroxide concentrations of 2 Mol/L and 3 Mol/L were approximately −25% and approximately −8%, respectively, indicating a sudden decrease.

Therefore, if the sodium hydroxide concentration of the sodium hydroxide solution to be brought into contact with the silicotitanate compound is set within a range of 0.5 Mol/L or more but less than 2.0 Mol/L, the distribution coefficient of Cs-137 in the silicotitanate compound subjected to the caustic treatment increases extremely. It is preferable to set the sodium hydroxide concentration within a range from 0.8 Mol/L to 1.5 Mol/L.

Further, it is desirable to use the sodium hydroxide solution within a range of 5 L to 20 L per 1 kg of the silicotitanate compound, preferably within a range of 5 L to 10 L. One kilogram of the silicotitanate compound, CST for example, has the volume of 1.25 L. When immersing 1 kg of the silicotitanate compound in the sodium hydroxide solution in a vessel, if 5 L of the sodium hydroxide solution does not exist, 1 kg of the silicotitanate compound cannot be immersed sufficiently. Inversely, if the quantity of the sodium hydroxide solution where 1 kg of the silicotitanate compound is immersed exceeds 20 L, the quantity of a waste liquid of the sodium hydroxide solution is increased extremely.

The time during which the silicotitanate compound is brought into contact with the sodium hydroxide solution may be set within a range from 0.5 hour to 2 hours. Set the contact time of the sodium hydroxide solution with the silicotitanate compound within the range from 0.5 hour to 2 hours, and sufficient Na substitution will be performed in the silicotitanate compound. Namely, if the contact time is less than 0.5 hour, the aforementioned Na substitution in the silicotitanate compound is not sufficient. Further, even if the contact time elapses for longer than 2 hours, the Na substitution quantity in the silicotitanate compound is not changed and the time required for manufacture of the adsorbent just becomes longer.

As mentioned above, the adsorptive performance of the radioactive strontium was improved by bringing the silicotitanate compound, concretely the CST, into contact with the sodium hydroxide solution at a sodium hydroxide concentration within the range of 0.5 Mol/L or more but less than 2.0 Mol/L and subjecting it to the caustic treatment, resulting in that the inventors were successful in manufacturing a radionuclide adsorbent capable of adsorbing the radioactive cesium and radioactive strontium.

Further, as CST, IE-910 may be used in place of IE-911. In this case, a binder is added to IE-910 to form it and then the caustic treatment is performed for the formed IE-910.

The embodiments of the present invention reflecting the above examination results will be explained below.

Embodiment 1

A method of producing a radionuclide adsorbent according to embodiment 1 which is a preferable embodiment of the present invention will be explained by referring to FIGS. 1 and 2.

A radionuclide adsorbent production apparatus 1 used in the method of producing the radionuclide adsorbent of the present embodiment will be explained by referring to FIG. 2. The radionuclide adsorbent production apparatus 1 is provided with a caustic treatment apparatus 2, an adsorbent raw material supply apparatus 3, a caustic agent supply apparatus 6, and a cleaning water supply apparatus 9. The caustic treatment apparatus 2 is a vessel. The adsorbent raw material supply apparatus 3 is connected to the caustic treatment apparatus 2 by a pipe 4 with an open/close valve 5 installed. The caustic agent supply apparatus 6 is connected to the caustic treatment apparatus 2 by a pipe 7 with an open/close valve 13 and a pump 8 installed. The cleaning water supply apparatus 9 is connected to the pipe 7 between the open/close valve 13 and the pump 8 by a pipe 10 with an open/close valve 14 installed. A discharge pipe 11 with an open/close valve 12 installed is connected to the bottom of the caustic treatment apparatus 2.

The method of producing the radionuclide adsorbent of the present embodiment will be explained by referring to FIG. 1.

The granular silicotitanate compound (for example, CST) is formed (step S1). A binder made up of an inorganic substance is added to IE-910 which is a powdery CST and granular CST is formed, and thereby CST in the formed state is obtained. Many CSTs in the formed state (for example, granular CST) are filled in the adsorbent raw material supply apparatus (concretely, a tank) 3.

The caustic treatment is performed for the silicotitanate compound (step S2). A wire netting cage (not shown) for holding the granular CST is disposed in the vessel of the caustic treatment apparatus 2. When the open/close valve 5 is opened, a predetermined quantity of granular CST is supplied into the cage in the caustic treatment apparatus 2 from the adsorbent raw material supply apparatus 3. The stitches of the cage are smaller than a size of the granular CST, so that the granular CST supplied into the cage does not fall through the stitches of the cage and is held by the cage. After feeding granular CST into the caustic treatment apparatus 2, the open/close valve 13 is opened and the pump 8 is driven. The sodium hydroxide solution in the caustic agent supply apparatus 6 is supplied into the caustic treatment apparatus 2 through the pipe 7. At this time, the open/close valve 14 is closed. The sodium hydroxide concentration of the sodium hydroxide solution to be supplied into the caustic treatment apparatus 2 is, for example, 1 Mol/L. For example, a sodium hydroxide solution of 10 L per 1 kg of granular CST filled in the caustic treatment apparatus 2 is supplied. As a result, a water surface of the sodium hydroxide solution in the caustic treatment apparatus 2 reaches upward an upper end of a filled layer of granular CST in the cage existing in the caustic treatment apparatus 2. A liquid level meter (not shown) is installed in the caustic treatment apparatus 2. When the liquid level inside the caustic treatment apparatus 2, which is measured by the liquid level meter, becomes the set liquid level that a predetermined quantity of a sodium hydroxide solution reaches when it is supplied to the caustic treatment apparatus 2, the pump 8 is stopped and the open/close valve 13 is closed.

After the predetermined quantity of the sodium hydroxide solution is supplied to the caustic treatment apparatus 2, the granular CST may be supplied into the cage in the caustic treatment apparatus 2.

After the supply of the sodium hydroxide solution into the caustic treatment apparatus 2 is stopped, in the state that the granular CST in the cage is immersed in the sodium hydroxide solution, the granular CST is left to stand for a predetermined time, for example, 0.5 hour in the caustic treatment apparatus 2. When 0.5 hour elapses from the point of time when the granular CST is immersed in the sodium hydroxide solution, the open/close valve 12 is opened. The sodium hydroxide solution in the caustic treatment apparatus 2 is discharged into the discharge pipe 11. The sodium hydroxide solution discharged into the discharge pipe 11 is neutralized and then discharged into the outside environment. Na included in the sodium hydroxide solution is taken into the granular CST by the caustic treatment of the granular CST, so that the sodium hydroxide concentration of the sodium hydroxide solution is reduced. Therefore, the sodium hydroxide solution can be reused for the caustic treatment of the granular CST by adding sodium hydroxide to the sodium hydroxide solution discharged from the caustic treatment apparatus 2 so as to increase the sodium hydroxide concentration to a predetermined concentration.

After the discharge of the sodium hydroxide solution from the inside of the caustic treatment apparatus 2 ends, the open/close valve 12 is closed once, and then the open/close valve 14 is opened to drive the pump 8. Cleaning water (pure water or deionized water) from the cleaning water supply apparatus 9 is supplied to the caustic treatment apparatus 2 through the pipes 10 and 7. The granular CST subjected to the caustic treatment is cleaned by the supplied cleaning water in the caustic treatment apparatus 2 and the sodium hydroxide solution adhered to the granular CST is removed. After the granular CST is cleaned, the open/close valve 12 is opened, and thereby the cleaning water used to clean the granular CST is discharged from the caustic treatment apparatus 2 into the discharge pipe 11. Such cleaning of the granular CST in the caustic treatment apparatus 2 is carried out several times by supplying cleaning water to the caustic treatment apparatus 2. Even after the caustic treatment ends, the granular CST in the caustic treatment apparatus 2 may be cleaned continuously by cleaning water while supplying cleaning water into the caustic treatment apparatus 2 with the open/close valve 12 kept open. After the cleaning of the granular CST subjected to the caustic treatment, the pump 8 is stopped and the open/close valve 14 is closed.

The cover of the caustic treatment apparatus 2 is removed and the cage with the granular CST filled is taken out from the caustic treatment apparatus 2. The granular CST subjected to the caustic treatment is filled in the adsorption vessel of the radioactive waste liquid treatment system (not shown) for treating a radioactive waste liquid including radioactive cesium and radioactive strontium and is used to treat the radioactive waste liquid. The granular CST subjected to the caustic treatment which is filled in the adsorption vessel adsorbs and removes the radioactive cesium and radioactive strontium.

The caustic treatment for the formed CST is performed at the process of the step S2, thereby obtaining a Cs—Sr adsorbent capable of adsorbing the radioactive cesium and radioactive strontium at the same time.

As a caustic treatment to be subjected to the CST (formed) at the process of the step S2, an operation of immersing the CST (formed) in the sodium hydroxide solution for a given period of time and an operation of filling the CST (formed) in a vessel and permitting the sodium hydroxide solution to pass through the vessel may be cited.

Figure 1:
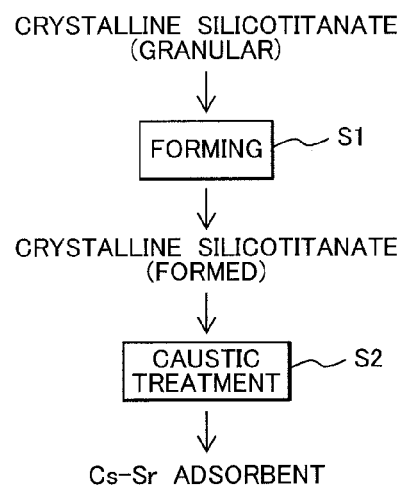
FIG. 1 is a flow chart showing a manufacturing procedure in a method of producing a radionuclide adsorbent according to embodiment 1, which is a preferable embodiment of the present invention.
Figure 2:
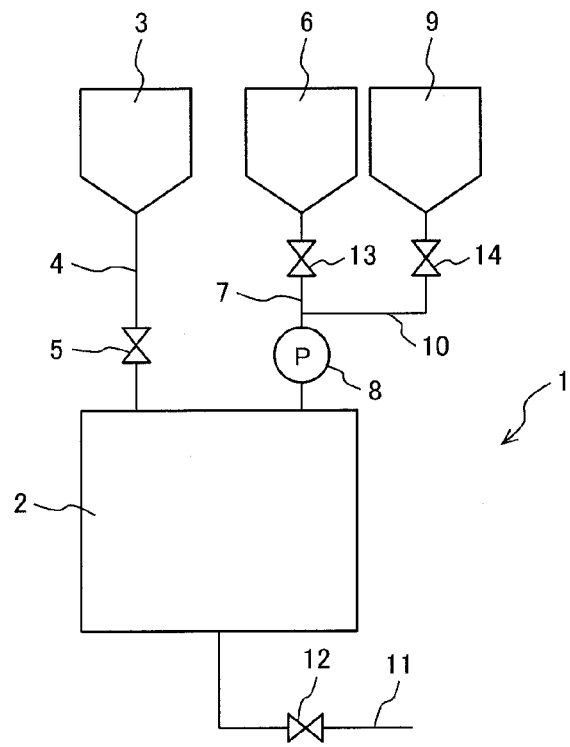
FIG. 2 is a structural diagram showing a radionuclide adsorbent production apparatus used in a method of producing a radionuclide adsorbent according to embodiment 1.

In FIG. 1, a method of producing a Cs—Sr adsorbent using CST (powder) as a raw material is described, though a Cs—Sr adsorbent may be produced using CST (formed) as a raw material. In that case, the S1 process is omitted.

According to the present embodiment, since the granular CST is immersed in the sodium hydroxide solution at the sodium hydroxide concentration of 1 Mol/L, that is, is brought into contact with the sodium hydroxide solution, a radionuclide adsorbent in which the respective adsorptive performances of the radioactive cesium and radioactive strontium are improved more can be obtained.

According to the present embodiment, a radionuclide adsorbent in which the removal efficiency of cesium included in the radioactive waste liquid is 99% or more and the removal efficiency of strontium is 95% or more can be obtained.

In the present embodiment, the granular CST is immersed in the sodium hydroxide solution for the predetermined period of time in the caustic treatment apparatus 2, though, alternatively, the following process may be used: circulate the sodium hydroxide solution between the caustic agent supply apparatus 6 and the caustic treatment apparatus 2, and bring granular CST and the flowing sodium hydroxide solution into contact with each other for a predetermined period of time in the caustic treatment apparatus 2 to perform the caustic treatment for the granular CST.

In the present embodiment, granular IE-910 is used as CST, though even if IE-911 which is formed CST is used and as mentioned above, the caustic treatment is performed for the IE-911, a radionuclide adsorbent in which the respective adsorptive performances of the radioactive cesium and radioactive strontium are improved more can be obtained. When using IE-911, the aforementioned process of the step S1 becomes unnecessary.

In embodiment 1, the granular CST is filled in the cage in the caustic treatment apparatus 2, though even if the following is executed, when discharging the sodium hydroxide solution from the caustic treatment apparatus 2, the granular CST subjected to the caustic treatment can be prevented from flowing out from the caustic treatment apparatus 2 and the granular CST subjected to the caustic treatment can be taken out from the caustic treatment apparatus 2. The discharge pipe 11 is used for exclusive discharge of the sodium hydroxide solution and another discharge pipe for discharging cleaning water with another open/close valve installed is connected to the caustic treatment apparatus 2. An outlet of the caustic treatment apparatus 2 communicated with the discharge pipe 11 is covered with the wire nitting having meshes through which the granular CST does not pass. The granular CST supplied from the adsorbent raw material supply apparatus 3 is filled in the caustic treatment apparatus 2, and then the sodium hydroxide solution is supplied from the caustic agent supply apparatus 6 into the caustic treatment apparatus 2, and the caustic treatment for the granular CST is executed. After the caustic treatment, the open/close valve 12 is opened and the sodium hydroxide solution in the caustic treatment apparatus 2 is discharged into the discharge pipe 11. At this time, the granular CST in the caustic treatment apparatus 2 does not flow into the discharge pipe 11 due to the wire nitting covering the outlet of the caustic treatment apparatus 2. After discharge end of the sodium hydroxide, as mentioned above, cleaning water is supplied into the caustic treatment apparatus 2 and the granular CST is cleaned. After cleaning end, another open/close valve is opened, and thereby the granular CST in the caustic treatment apparatus 2 flows out into another discharge pipe along with the cleaning water and flows out into another wire nitting cage disposed at an outlet of the another discharge pipe. The cleaning water is discharged outside another wire nitting cage and the granular CST remains in another wire nitting cage. In this way, the granular CST subjected to the caustic treatment can be taken out.

Further, the following may be executed. Another discharge pipe is not used, and the outlet of the caustic treatment apparatus 2 to the discharge pipe 11, as mentioned above, is covered with the wire nitting, and after the caustic treatment, the sodium hydroxide solution in the caustic treatment apparatus 2 is discharged into the discharge pipe 11 through the wire nitting, and after cleaning, the cleaning water in the caustic treatment apparatus 2 is discharged into the discharge pipe 11 through the wire nitting. The outlet of the caustic treatment apparatus 2 is covered with the wire netting, so that the granular CST in the caustic treatment apparatus 2, does not flow out into the discharge pipe 11 and remains in the caustic treatment apparatus 2 when the sodium hydroxide solution and cleaning water are discharged. The granular CST can be taken out from the caustic treatment apparatus 2 by sucking the remaining granular CST by a sucking device.

Embodiment 2

Figure 6:
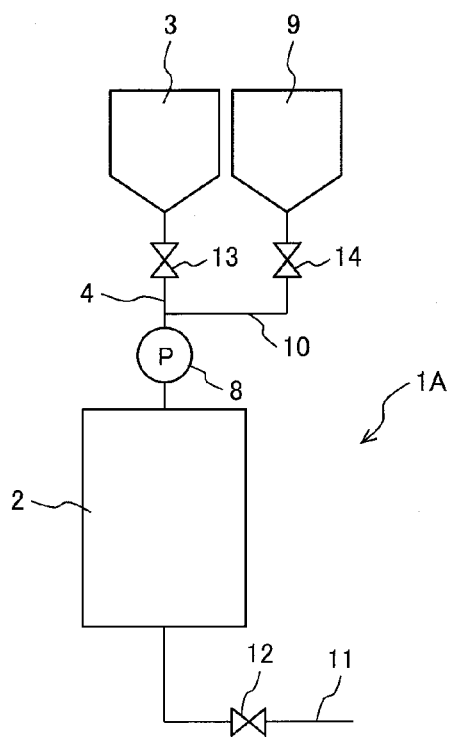
FIG. 6 is a structural diagram of the radionuclide adsorbent production apparatus used in a method of producing a radionuclide adsorbent according to embodiment 2 which is another preferable embodiment of the present invention.

A method of producing a radionuclide adsorbent according to 2 which is another preferable embodiment of the present invention will be explained by referring to FIG. 6. In method of producing the radionuclide adsorbent according to the present embodiment, a radionuclide adsorbent production apparatus 1A shown in FIG. 6 is used. The radionuclide adsorbent production apparatus 1A has a structure that in the radionuclide adsorbent production apparatus 1 used in embodiment 1, the adsorbent raw material supply apparatus 3 and the pipe 4 with the open/close valve 5 installed are eliminated. The other structures of the radionuclide adsorbent production apparatus 1A are the same as the structures of the radionuclide adsorbent production apparatus 1.

The method of producing the radionuclide adsorbent of the present embodiment using the radionuclide adsorbent production apparatus 1A will be explained below. The granular CST which is a silicotitanate compound is filled in the cage outside the caustic treatment apparatus 2. The cover of the caustic treatment apparatus 2 is removed, and the cage with the granular CST filled is set in the caustic treatment apparatus 2, and the removed cover is attached to the caustic treatment apparatus 2.

After that, the caustic treatment of the silicotitanate compound executed in embodiment 1 is executed in the caustic treatment apparatus 2 (step S2). The sodium hydroxide solution is supplied into the caustic treatment apparatus 2 where the granular CST is put, through the pipe 4 from the caustic agent supply apparatus 6. The sodium hydroxide concentration of the supplied sodium hydroxide solution is 1 Mol/L. For example, 10 L of a sodium hydroxide solution per 1 kg of granular CST filled in the caustic treatment apparatus 2 is supplied into the caustic treatment apparatus 2 for a passing time of 10 hours. The open/close valve 12 is opened. The passing time is preferably set within a range from 0.4 hour to 20 hours. The sodium hydroxide solution supplied to the caustic treatment apparatus 2 is discharged into the discharge pipe 11. The passing velocity of the sodium hydroxide solution in the caustic treatment apparatus 2 should be a velocity at which the sodium hydroxide solution of 1 to 20 times, preferably 5 to 10 times of the volume of the granular CST which is the silicotitanate compound filled in the caustic treatment apparatus 2 is made to pass through for one hour.

After the sodium hydroxide solution is supplied to the caustic treatment apparatus 2 for a predetermined period of time, the pump 8 is stopped, and the open/close valve 13 is closed, and the supply of the sodium hydroxide solution from the caustic agent supply apparatus 6 to the caustic treatment apparatus 2 is stopped. After that, the open/close valve 14 is opened, and the pump 8 is driven, and the cleaning water supply apparatus 9 supplies cleaning water to the caustic treatment apparatus 2. The sodium hydroxide solution remaining in the caustic treatment apparatus 2 is pushed out by cleaning water and is discharged into the discharge pipe 11. The sodium hydroxide adhered to the granular CST in the caustic treatment apparatus 2 is cleaned by cleaning water and is removed from the surface of the granular CST. After cleaning end, the supply of cleaning water from the cleaning water supply apparatus 9 to the caustic treatment apparatus 2 is stopped, and the cage is taken out from the caustic treatment apparatus 2, and thereby the granular CST with the caustic treatment performed is taken out.

The present embodiment can obtain the effects generated by embodiment 1. In the present embodiment, since the radionuclide adsorbent production apparatus 1A used in the present embodiment does not need the adsorbent raw material supply apparatus 3 and the pipe 4 with the open/close valve 5 installed, the radionuclide adsorbent production apparatus 1A is made compact.

REFERENCE SIGNS LIST

1, 1A: radionuclide adsorbent production apparatus, 2: caustic treatment apparatus, 3: adsorbent raw material supply apparatus, 6: caustic agent supply apparatus, 9: cleaning water supply apparatus.

What is claimed is:

1. A method of producing a radionuclide adsorbent, comprising the steps of:
    forming powdery silicotitanate compounds into a formed silicotitanate compound;
    storing said formed silicotitanate compound in a cage having a plurality of openings, wherein said formed silicotitanate compound is being held by said cage;
    disposing said cage holding said formed silicotitanate compound into a vessel of a caustic treatment apparatus; and
    bringing said formed silicotitanate compound into contact with a sodium hydroxide solution having a sodium hydroxide concentration within a range of 0.5 Mol/L or more but less than 2.0 Mol/L in said caustic treatment apparatus, wherein said sodium hydroxide solution is present in said vessel, and wherein said formed silicotitanate compound is immersed in said sodium hydroxide solution in said caustic treatment apparatus for 0.5 hour to 2 hours.

2. The method of producing a radionuclide adsorbent according to claim 1, wherein said sodium hydroxide concentration of said sodium hydroxide solution in contact with said formed silicotitanate compound is within a range from 0.8 Mol/L to 1.5 Mol/L.

3. The method of producing a radionuclide adsorbent according to claim 1, wherein said sodium hydroxide solution is supplied into said caustic treatment apparatus within a range from 5 L to 20 L per 1 kg of said formed silicotitanate compound put in said caustic treatment apparatus.

4. The method of producing a radionuclide adsorbent according to claim 1, wherein said contact of said sodium hydroxide solution with said formed silicotitanate compound is performed by permitting said sodium hydroxide solution to continuously flow through said caustic treatment apparatus.

5. The method of producing a radionuclide adsorbent according to claim 1, wherein the size of said opening is smaller than the size of said formed silicotitanate compound.

6. The method of producing a radionuclide adsorbent according to claim 1, wherein said cage is a wire netting cage.

* * * * *